Oct. 13, 1959 R. E. STEGLER 2,908,797
MEANS FOR AND METHOD OF MACHINING METALS
Filed June 21, 1956 2 Sheets-Sheet 1

INVENTOR.
Richard E. Stegler
BY
Franz O. Ohlson, Jr.
ATTORNEY.

Oct. 13, 1959  R. E. STEGLER  2,908,797
MEANS FOR AND METHOD OF MACHINING METALS
Filed June 21, 1956  2 Sheets-Sheet 2
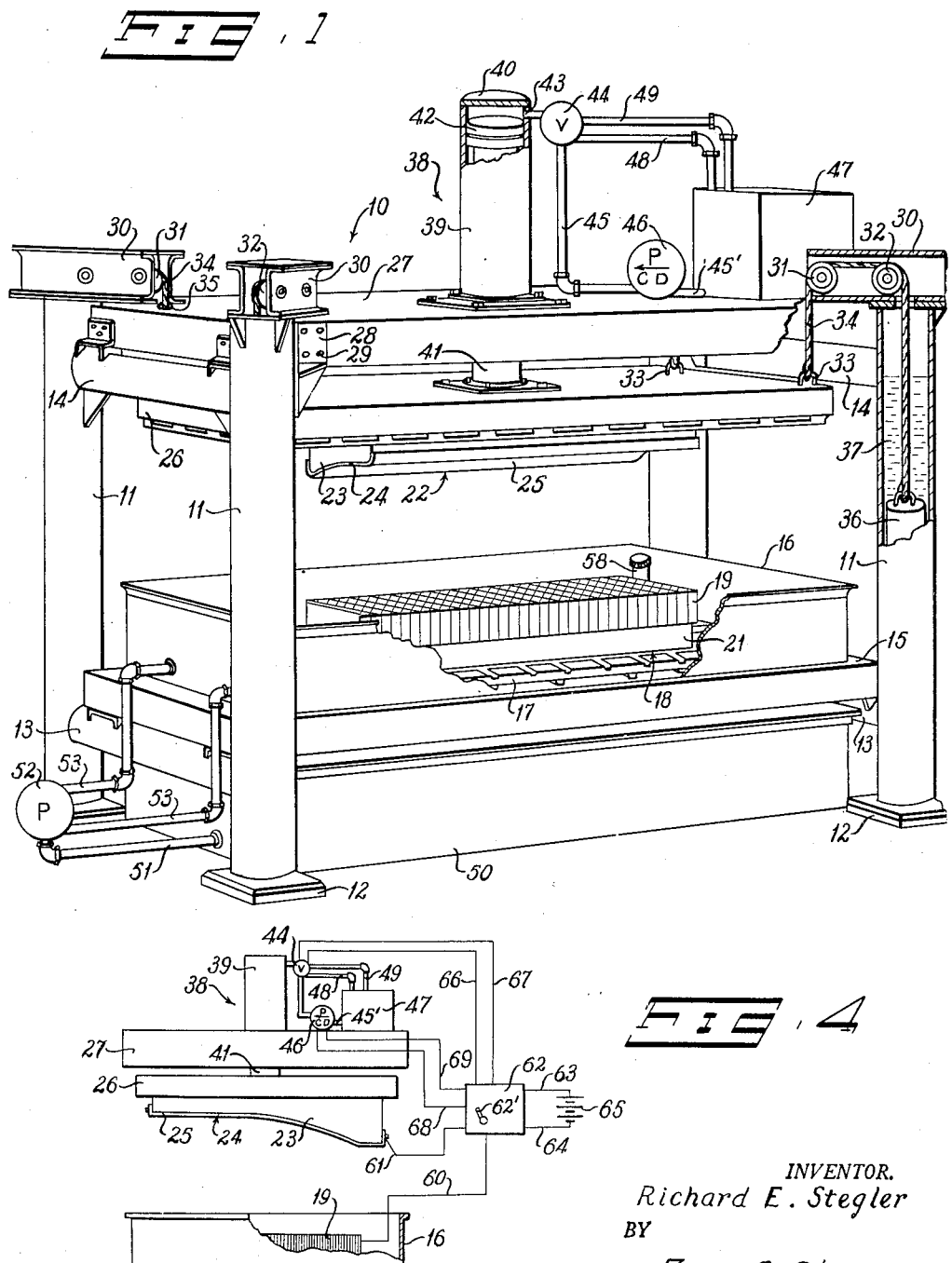
INVENTOR.
Richard E. Stegler
BY
Franz O. Ohlson, Jr.
ATTORNEY.

United States Patent Office 2,908,797
Patented Oct. 13, 1959

2,908,797

MEANS FOR AND METHOD OF MACHINING METALS

Richard E. Stegler, Stony Brook, N.Y., assignor to Republic Aviation Corporation, Farmingdale, N.Y., a corporation of Delaware Application June 21, 1956, Serial No. 592,770

9 Claims. (Cl. 219—69)

This invention relates in general to the shaping or machining of metals and more particularly to a method of and apparatus for electrically shaping or machining metallic materials including but not limited to honeycomb core materials.

In electrical machining or electro-shaping as herein contemplated, the tool and workpiece are connected into and form a part of an electrical circuit whereby when they are brought into close, spaced relationship a series of electrical sparks or arcs are produced across the gap or space between their adjacent surfaces. Each of these electrical sparks removes a small particle or chip of the workpiece at the point of impact thereby machining or shaping the workpiece into conformance with the contour or contours of the tool.

In order to produce the electrical sparks and assure the accurate shaping of the workpiece to conform to the contour established by the tool, it is necessary to maintain within relatively close tolerances, a narrow space or spark gap between the adjacent surfaces of the tool and workpiece across which the electrical sparks are produced during the shaping operation.

The present invention proposes and has for one of its objects the provision of electro-shaping apparatus embodying means whereby the tool and the workpiece may be moved relatively to establish and maintain a spark gap between them sufficient for the shaping operations.

The instant invention also proposes a method of and means for disposing of or removing the particles or chips resulting from the shaping or machining operation to the end that a short circuit or a direct electrical connection between the tool and workpiece is eliminated.

With the above and other objects in view as will be apparent, this invention consists in the steps, construction, combination and arrangement of parts all as hereinafter more fully described, claimed and illustrated in the accompanying drawings wherein:

Fig. 1 is a perspective view, partially in section, of the electro-shaping apparatus constructed in accordance with the present invention;

Figure 3:
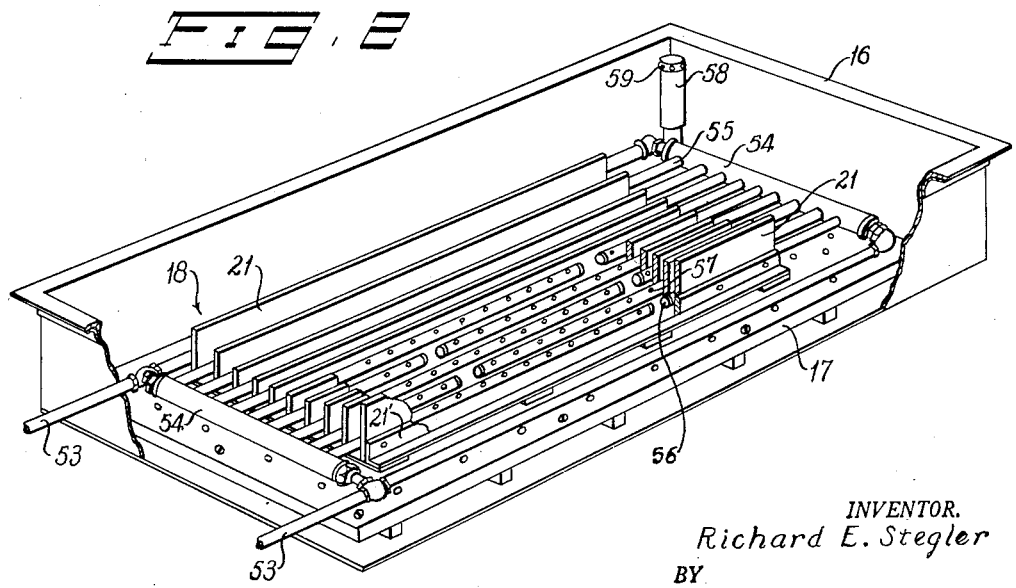

Fig. 3 is a perspective view of the tank of the instant apparatus in which the forming or machining takes place with parts of the side walls thereof broken away to show the means for supporting the workpiece and for removing the chips or particles produced during forming or machining operations; and Fig. 4 is a diagrammatic illustration of the instant apparatus and of the hydraulic and electrical control circuits associated therewith.

As illustrated in Fig. 1, the electro-shaping apparatus contemplated herein includes an open frame 10 formed by four or more rectangularly disposed, hollow columns 11, each having a base plate or pedestal 12 at its lower end whereby it may be mounted and supported in a vertical position. Across each end of the frame 10 the columns 11 are joined, adjacent their lower and upper end portions, by horizontal cross-beams 13 and 14, respectively. These cross-beams 13 and 14 may be welded or otherwise suitably secured at their opposite extremities to the adjacent column 11.

Figure 2:
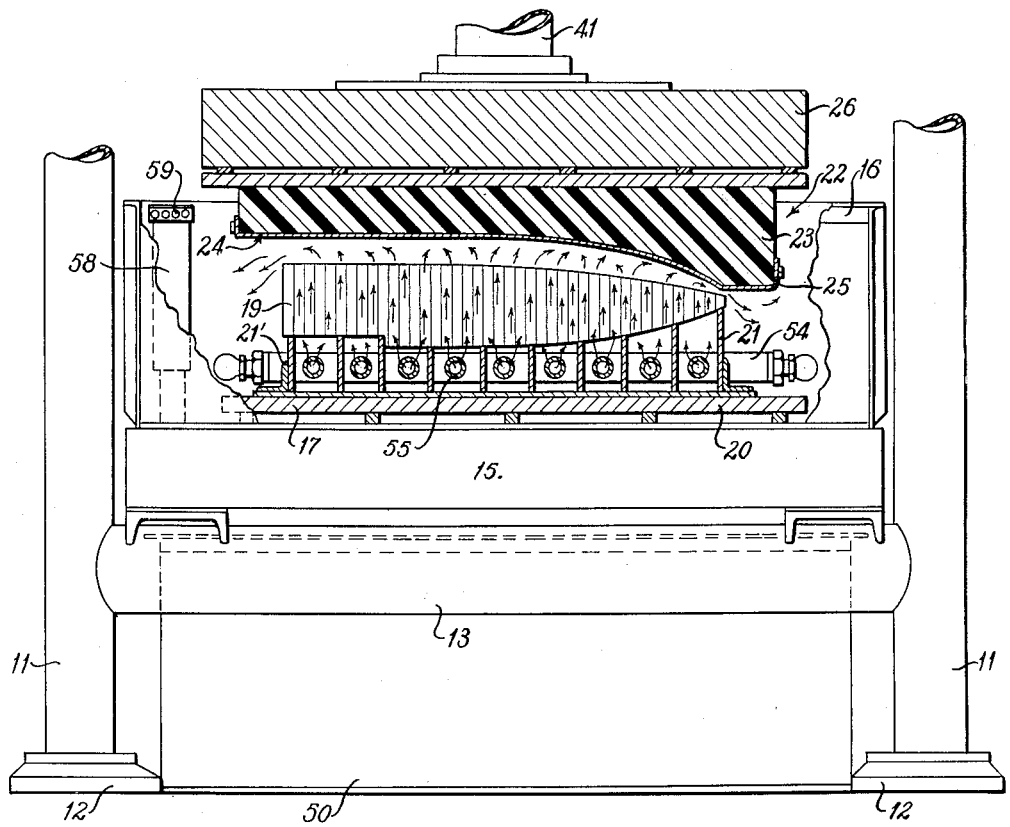
Fig. 2 is a fragmentary side view, partly in section, of the apparatus shown in Fig. 1 illustrating the cooperation of the tool and workpiece during a forming or machining operation.

The lower cross-beams 13 serve to support the opposite ends of a rectangular table 15 upon which is positioned an open tank 16. As shown more particularly in Fig. 3, the bottom of the tank 16 is provided with a bolster pad 17 upon which is mounted a rack 18 for supporting a metallic workpiece 19, in this instance, a rectangular piece of honeycomb core material. The rack or work support 18 comprises a flat rectangular base plate 20 having a plurality of longitudinal, parallel, upstanding slats 21 attached to its upper surface by any conventional means such as the angle irons 21'. One arm of each angle iron 21' is fixedly secured to the base plate 20 while its other arm is similarly attached to a slat 21. In Fig. 2 the angle irons 21' which support the intermediate slats 21 are not shown but it is to be understood that each slat is secured to and mounted on the base plate 20 by such an angle iron.

The workpiece 19 rests upon the upper edges of the slats 21 and their length and height are dimensioned accordingly. Thus, as shown in Fig. 2, the side of the workpiece 19 resting upon the upper edges of the slats 21 has been previously shaped or contoured, and therefore, the height of the slats 21 have been varied accordingly to conform to and intimately support that side of the workpiece. On the other hand, if the under or lower side of the workpiece 19 is flat, the upper edges of the slats 21 will be in the same horizontal plane to the end that workpiece 19 is completely supported thereby.

A shaping or machining tool 22, which may be of the type shown and described in applicant's co-pending application, Serial No. 511,605, filed May 27, 1955, is supported within the frame 10 for vertical movement relative to the workpiece 19 as it is supported on the rack 18. The tool 22 comprises a body 23, which may be made of synthetic resin or any other suitable material, having a contoured surface 24 to which the workpiece 19 is to be formed. The surface 24 is covered by a replaceable metallic cap or working face 25 that is formed on the body 23 so as to precisely follow its contoured surface 24 and which is removably secured thereto by any suitable means. The working face or cap 25, as well as the workpiece 19, serve as electrodes during shaping or machining operations. The body 23 of the tool 22 is secured by any conventional means to the lower surface of the head 26 of the machine or apparatus and this head is dimensioned to be received within the tank 16 and carries the tool 22 with it. It is to be understood that the tank 16 and head 26 may be of any desired shape or size.

As shown in Fig. 1, the head 26 is mounted within the frame 10 for vertical movement between the tank 16 and a platform 27 supported at its opposite ends upon the upper cross-beams 14 between the columns 11. Additionally, each corner of the platform 27 is secured to the upper end of the adjacent column 11 by any suitable means, such as the gussets 28 and the rivets 29. A pulley housing 30 having inner and outer pulleys 31 and 32, respectively, rotatably supported therein is mounted in each corner of the platform 27 so as to be supported in part by the upper surface of the platform 27 and in part by the upper end of the adjacent column 11. The head 26 is provided with four loops 33, one at each of its four corners, which are disposed to extend vertically from the upper surface of the head. Each loop 33 receives one end of a cable 34 that passes through a vertical opening 35 formed through the adjacent corner of the platform 27. This cable 34 is reeved over the inner and outer pulleys 31 and 32, respectively, and then passes downwardly into the associated hollow column 11 where its opposite end is attached to a weight 36 slidably disposed within the column 11. Thus, the head 26 is attached at each of its four corners, through the cables 34, to the weights 36 which impose a force or load on the head 26 tending to move it vertically toward the stationary platform 27 and away from the workpiece 19 supported on the rack 18. To dampen the vertical movements of the weights 36 within the columns 11 and incidentally to reduce friction, each column 11 contains oil or any other suitable liquid 37 surrounding the weights 36 therein.

The head 26 is moved downwardly toward the workpiece 19 against the opposition of the weights 36 by means of a hydraulic actuator assembly 38. This hydraulic actuator assembly 38 comprises a cylinder 39 vertically mounted on the upper surface of the platform 27 with an open end surrounding and enclosing an opening (not shown) formed in and through the center of the platform 27. The upper end of the cylinder 39 is closed by a wall 40. A ram 41 secured at its lower end to the upper surface of the head 26, extends upwardly through the opening in the platform 27 and into the cylinder 39. At its upper end, the ram 41 is provided with a piston head 42 that is mounted for reciprocation within the cylinder 39.

The upper end of the cylinder 39 is provided with a port 43 that communicates above the piston head 42 with the interior of the cylinder 39 and with an electrically actuated valve 44 suitably mounted on the cylinder 39 and which controls the operation of the hydraulic actuator assembly 38. The valve 44 is connected by way of a delivery conduit 45 to the outlet of an electrically operated constant delivery pump 46 having its inlet connected through a conduit 45' with a reservoir 47 containing hydraulic fluid. The valve 44 also communicates by way of a by-pass conduit 48 and a return conduit 49 with the reservoir 47. As shown in Fig. 1, the pump 46 and reservoir 47 may be mounted on, or secured to, the upper surface of the platform 27 by any suitable means.

Upon the operation of the pump 46 the hydraulic fluid is drawn from the reservoir 47 through the conduit 45' and into the pump 46 whence it is pumped through the delivery or pressure conduit 45 to the valve 44. The valve 44 is constructed and arranged to meter the flow of hydraulic fluid from the delivery conduit 45 so that it is delivered entirely to the port 43, or to the by-pass conduit 48, or is distributed between the port 43 and the conduit 48. During these operations of the valve 44 the return conduit 49 is closed to the port 43. Thus, by metering the flow of the pressurized hydraulic fluid to either the port 43 or the by-pass conduit 48 or to both, the quantity of pressurized hydraulic fluid delivered to the interior of the cylinder 39 and effective on the piston head 42 is controlled and hence the movement of the ram 41 in response thereto is also controlled. In other words the delivery of the pressurized hydraulic fluid to the cylinder 39 is controlled in such a manner as to initiate and vary or control the downward rate of movement of the head 26, and hence, of the tool 22, toward the workpiece 19. The valve 44 is also constructed and arranged to simultaneously connect the port 43 to the return conduit 49 and concurrently the delivery conduit 45 to the by-pass conduit 48. Under these conditions the interior of the cylinder 39 is connected directly to the reservoir 47 while the output of the pump 46 is by-passed back to the reservoir 47. Therefore, the pressure on the hydraulic fluid within the cylinder 39 is so relieved that the weights 36 then become effective to move the head 26 vertically away from the workpiece 19 and thereby discharge the fluid from the cylinder 39. As will hereinafter be more fully set forth, the valve 44 and pump 46, together with the workpiece 19 and the metallic facing or cap 25 of the tool 22, are connected into an electrical control circuit whereby the operation of the valve 44 as aforesaid is automatically controlled as a function of the distance between the adjacent surfaces of the working face or cap 25 of the tool 22 and the workpiece 19.

During electrical shaping or machining operations, the tank 16 is substantially filled with a dielectric fluid in which the workpiece 19 and the working face 25 of the tool 22 are immersed. Moreover, in accordance with the instant invention, the dielectric fluid is so supplied to the tank 16 that it may be circulated through the openings in the honeycomb core material of the workpiece 19. It also may be circulated between the adjacent surfaces of the workpiece 19 and the working face 25 of the tool 22. This circulation of the fluid in the tank 16 removes or disposes of any particles or chips produced during the shaping operation and may also serve as a coolant. To these ends, an open tank or reservoir 50 containing the dielectric fluid is disposed directly beneath the table 15. A conduit 51 connects the tank 50 with the inlet of a conventional, electrically driven, reversible pump 52 that is connected in a suitable electrical circuit (not shown) for controlling its operation. The pump 52 is provided with two outlets, each of which is connected through a conduit 53 to a pair of manifolds 54, one manifold being disposed across one end of the rack 18. A plurality of distributing pipes 55 extends laterally from the manifolds 54 and each pipe 55 is disposed between adjacent slats 21. Each distributing pipe 55 is closed at its outer end by a plug 56 and is provided throughout its length with a plurality of openings or ports 57 whereby the dielectric fluid is directed against the face or surface of the workpiece 19 resting upon the upper edges of the slats 21. The tank 16 is also provided with a suitable overflow drain 58 having an inlet 59 disposed at a desired height within the tank 16 and an outlet (not shown) that communicates with the reservoir 50.

Due to the foregoing construction and arrangement, when the pump 52 is operated, the dielectric fluid is drawn from the reservoir 50 through the conduit 51 to the inlet of the pump 52. From the pump 52, the fluid under pressure passes through the conduits 53 to the manifolds 54 and into the distributing pipes 55. The dielectric fluid passes out of the ports 57 in the pipes 55 and is directed through the cells or openings in the workpiece 19. Thus, the dielectric fluid is circulated through and around the workpiece 19 as indicated by the arrows in Fig. 2. When the level of the dielectric fluid in the tank 16 reaches the inlet 59 of the overflow drain 58, it will pass through the drain 58 to be returned to the reservoir 50. If desired, the drain 58 may be equipped with any suitable filtering means for removing from the dielectric fluid any foreign bodies contained therein such as particles or chips of the workpiece 19 produced during its shaping or machining.

As hereinbefore set forth, the workpiece 19, the working face 25 of the tool 22, the valve 44 and the pump 46 are all connected into and form a part of an electrical control circuit whereby the operation of the valve 44, and hence the movement of the tool 22 relative to the workpiece 19, is controlled as a function of the distance between the adjacent surfaces of the workpiece 19 and the metallic working face or cap 25 of the tool 22. More particularly (Fig. 4) the workpiece 19 and the working face 25 of the tool 22 are connected by flexible electrical leads 60 and 61, respectively, to a control unit 62 including a control member 62'. The control unit 62 in turn is connected by electrical leads 63 and 64 to a source of electrical power 65. The valve 44 is connected through electrical leads 66 and 67 to the control unit 62, while electrical leads 68 and 69 connect the pump 46 to the control unit 62. The control unit per se forms no part of the present invention and its functions, which are a part of this invention, may be accomplished by any one of a number of such units available on the open market.

Referring now to Fig. 1, the instant electro-shaping apparatus is shown after the workpiece 19 has been positioned on the work support or rack 18 and is ready to be shaped or machined to conform to the contoured working face or cap 25 of the tool 22. At this time, the control member 62' of the control unit 62 is positioned to disconnect the power source 65 from the workpiece 19, working face 25, valve 44 and pump 46. Under these conditions, the valve 44 communicates the port 43 with the return conduit 49 thereby connecting the interior of the cylinder 39 with the reservoir 47. As a result, the weights 36 are effective through the cables 34 to hold the head 26 and the attached tool 22 in its uppermost position, i.e., adjacent to and directly beneath the platform 27.

At this point in the machining or shaping operation, the tank 16 is filled with the dielectric fluid from the reservoir 50 so as to completely immerse the workpiece 19. To accomplish this, the pump 52 is actuated to draw the dielectric fluid from the reservoir 50 through the conduit 51 and into the pump 52 whence it is pumped through the conduits 53 and manifolds 54 into the distributing pipes 55. The dielectric fluid leaves the pipes 55 through the ports 57 formed therein and is circulated through and around the workpiece 19 as indicated by the arrows in Fig. 2.

When the tank 16 has been filled and the workpiece 19 is completely immersed in the dielectric fluid the control member 62' of the control unit 62 is moved to connect the power source 65 to the workpiece 19, the working face 25 of the tool 22, the valve 44, and the pump 46. In response the pump 46 becomes operative as aforesaid to pump the hydraulic fluid from the reservoir 47 through the delivery conduit 45 to the valve 44. Concurrently with the operation of the pump 46, the valve 44 is energized to close the return conduit 49 to the port 43 and to meter the flow of fluid from the delivery conduit 45 in such a manner that it is delivered entirely to the port 43. Hence, the entire output of the pressurized hydraulic fluid from the pump 46 is delivered into the interior of the cylinder 39 where it is effective on the piston head 42 to extend the ram 41 and move the head 26 carried thereby, downwardly toward the tank 16. When the valve 44 meters the entire flow of the hydraulic fluid from the delivery conduit 45 to the port 43, the tool 22 is moved toward the workpiece 19 at a relatively rapid rate.

The continued downward movement of the tool 22 moves it into the tank 16, where its working face 25 also becomes immersed in the dielectric fluid contained therein. As above described, the working face or cap 25 and the workpiece 19 are connected through the control unit 62 with the power source 65. Therefore, these elements, in effect, comprise a pair of electrodes between which an electrical spark or arc is generated when they are brought into a predetermined spaced relationship. The characteristics of the electrical spark, i.e., its intensity and direction as well as the distance or gap across which it is produced are determined by the type of current being fed to these electrodes from the power source. For example, a high rate of metal removal may be attained with a high density, low frequency current but this results in a relatively rough-finished workpiece. On the other hand a smoother finish may be obtained on the workpiece by supplying a relatively low density, high frequency current to the workpiece and tool. Moreover, it is desirable to use unidirectional current, such as a pulsating direct current, from the tool to the workpiece to the end that a maximum amount of metal is removed from the workpiece with a minimum effect on the working face or cap 25 of the tool 22.

It is apparent, therefore, that as the working face 25 approaches the workpiece 19, at some preselected distance or gap between their adjacent surfaces determined by the type of current then being used, a series of electrical sparks are generated or produced across the gap and through the circulating dielectric fluid. Each of these sparks removes a chip or particle of the workpiece 19 at the point of its impact thereon, thus shaping or machining the workpiece 19 into conformance with the contour of the working face 25. Since the dielectric fluid is being circulated through or about the workpiece 19, it flows between the adjacent surfaces of the workpiece 19 and the working face 25, thereby carrying away these chips or particles and preventing their becoming lodged or wedged between the workpiece 19 and the working face 25.

The spark gap or distance between the adjacent surfaces of the working face 25 of the tool 22 and the workpiece 19 across which the electrical arcs are produced is automatically maintained at the distance where optimum metal removal from the workpiece 19 is achieved. This is accomplished by controlling the metering operation of the valve 44 as a function of the current flow across the spark gap. Each spark is, in effect, a current flow through an electrical circuit including an ionized path through the dielectric fluid, the workpiece 19 and the working face 25, their respective leads 60 and 61 connecting them to the control unit 62 and the leads 63 and 64 connecting the latter to the power source 65. Moreover, the current flow through this ionized path is determined by the dimension of the spark gap between the workpiece 19 and the working face 25. It follows, therefore, that the current flow through the above described electrical circuit varies as a function of the dimension of the spark gap, i.e., the distance between the adjacent surfaces of the workpiece 19 and the working face 25 of the tool 22. Thus, a wide spark gap results in a low current flow while a narrow spark gap results in a high current flow. This variation of the current flow in the electrical control circuit is effective on the control unit 62 to operate the valve 44 to meter the hydraulic fluid from the delivery conduit 45 to both the port 43 and the by-pass conduit 48 thereby varying the quantity of hydraulic fluid delivered to the cylinder 39 and hence reduce the speed of the downward rate of movement of the tool 22 toward the workpiece 19. As aforesaid, the valve 44 is initially operative to connect the port 43 directly to the delivery conduit 45 and the tool 22 moves downwardly at a relatively rapid rate. As the working face 25 approaches the workpiece 19, the space or gap between their adjacent surfaces is comparatively wide and therefore the initial series of sparks produced across this gap follows a relatively long path through the dielectric fluid and hence a relatively low current flows in this electrical circuit. However, as the working face 25 continues its movement toward the workpiece 19, the spark gap narrows or becomes smaller and the path shorter to the end that current flow in the electrical circuit is increased. In response to this variation in the current, the control unit 62 operates the valve 44 so that it is now effective to direct the hydraulic fluid from the delivery conduit 45 in part to the port 43 and in part to the by-pass conduit 48. As a result, the downward rate of movement of the tool 22 is decreased. Thus, as the working face 25 approaches the workpiece 19 its downward rate of movement is gradually decreased until it reaches a position where such rate of movement is substantially equal to the rate at which the metal is being removed from the workpiece 19, by the electrical sparks. At this point, the valve 44 is in its balanced position whereby the metering of the hydraulic fluid between the port 43 and by-pass conduit 48 serves to maintain the rate of the downward movement of the tool 22 substantially equal to that of metal removal from the workpiece 19.

Should, however, the gap between the adjacent surfaces of the workpiece 19 and the working face 25 become too small, the resulting variation in the current flow through this electrical circuit operates the valve 44 to direct all of the hydraulic fluid from the delivery conduit 45 into the by-pass conduit 48 and concurrently to close the port 43. Under these conditions, the downward movement of the ram 41 and hence of the tool 22 is arrested. However, the continued removal of metal from the workpiece 19 by the electrical sparks serves to gradually re-establish the proper spark gap or distance between the working face 25 and the workpiece 19. As this occurs, the concurrent change in the current flow across the spark gap is effective to gradually re-open the port 43 to delivery conduit 45 so that by the time the proper spark gap has been attained once more, the valve 44 is again in its balanced position whereby the downward rate of movement of the tool 22 is substantially equal to the rate at which the metal is being removed from the workpiece 19.

In the event the spark gap between the adjacent surfaces of the tool 22 and workpiece 19 becomes too narrow, or should actual contact occur therebetween, the resulting current flow actuates the valve 44 to connect the delivery conduit 45 directly to the by-pass conduit 48 as aforesaid, and the port 43 with the return conduit 49 thereby relieving the pressure of the hydraulic fluid in the cylinder 39. As a result, the weights 36 take over and are then effective to reverse the movement of the head 26 and the tool 22 so that the latter is elevated away from the workpiece 19. As the tool 22 moves upwardly the spark gap and the current flow vary so that as the working face 25 approaches the position where the proper spark gap is re-established, the valve 44 gradually closes the port 43 to the return conduit 49. As soon as communication between the port 43 and the return conduit 49 is closed, the valve 44 once more becomes effective to meter the hydraulic fluid from the delivery conduit 45 to both the port 43 and the by-pass conduit 48 to maintain the proper spark gap as aforesaid.

It is apparent from the foregoing description of the operation of the apparatus contemplated herein, that a close and accurate control is established over the movements of the tool 22 relative to the workpiece 19. Thus, by providing gravity-actuated means, i.e., the weights 36 and cables 34 to move the tool 22 in one direction relative to the workpiece 19, hydraulic-actuated means, i.e., the hydraulic actuator assembly 38 to move it in the opposite direction, against the load of the gravity-actuated means, and control means whereby both of these actuating means are controlled as a function of the distance between the adjacent surfaces of the tool 22 and workpiece 19, an extremely accurate and sensitive control is attained over the movements of the tool during shaping operations. This in turn affords a maximum rate of shaping or machining since the optimum spark gap between the adjacent surfaces of the tool and workpiece is maintained substantially constant or is rapidly re-established should it vary for any reason.

Upon the completion of the shaping or machining of the workpiece 19, i.e., when it has been shaped into conformance with the working face 25 of the tool 22, the control member 62' of the control unit 62 is returned to its off position to disconnect the workpiece 19, working face 25, valve 44 and pump 46 from the power source 65. The valve 44 then becomes effective to connect the port 43 to the return conduit 49, and the weights 36 raise the head 26 and ram 41 so that the piston head 42 is operative within the cylinder 39 to discharge the hydraulic fluid therein back into the reservoir 47. The disconnection of the power source 65 from the pump 46 arrests its operation so that the hydraulic fluid is no longer supplied or pumped from the reservoir 47 to the delivery conduit 45. Thus, the head 26 is returned to its position of rest as shown in Fig. 1.

The tank 16 can then be drained of the dielectric fluid by any conventional means (not shown) or the dielectric fluid may be pumped therefrom by reversing the operation of the pump 52 thereby readying the apparatus 10 for additional shaping or machining operations.

During the shaping or machining operation the passage of the electric sparks through the dielectric fluid produces free hydrogen. Under most circumstances this gas will be passed along the working face 25 to its edges by the circulating dielectric fluid and thus be dissipated into the surrounding atmosphere. However, certain tool configurations may be such that the hydrogen will be trapped or pocketed against a portion of the working face 25. In such instances, one or more vent holes through the working face and tool body can be provided at points where the hydrogen would be apt or liable to collect. These vent holes or ports will serve to bleed or vent off the hydrogen to the atmosphere or to any suitable collecting means.

Having thus described the construction, arrangement and operation of the instant electro-shaping apparatus, it is manifest that various changes and modifications may be made therein without departing from the spirit and scope of the present invention.

It is manifest from the foregoing that the method contemplated herein for electro-shaping or machining a workpiece of a metallic material into conformance with a contoured, conductive surface or working face of a tool consists of immersing the working face of the tool and workpiece within a dielectric fluid with the working face of the tool in spaced relationship with the workpiece to provide a gap or space therebetween, supplying an electrical current to the working face of the tool and the workpiece to produce a series of electrical sparks across the gap and through the dielectric fluid whereby each of said sparks dislodges a chip or particle of the workpiece at its point of impact thereon to conform the workpiece with the working face of the tool, circulating the dielectric fluid around the workpiece and between the adjacent surfaces of the workpiece and the working face of the tool to remove the chips or particles formed in the shaping operation, and moving the working face of the tool toward the workpiece at a rate substantially equal to that at which the metal is being removed from the workpiece by the electrical sparks.

What is claimed is:

1. In an apparatus for electro-shaping a metallic workpiece, the combination comprising a tank having a support therein for the workpiece, a tool having a metallic working surface, hydraulic-actuated means for movably mounting said tool for movement toward the workpiece, gravity-responsive means opposing the movement of said tool by said hydraulic-actuated means, a power source, an electrical circuit connecting said power source to the working surface of the tool and to the workpiece whereby an electrical discharge is developed between the working surface of the tool and the surface of the workpiece when positioned in predetermined spaced relationship thereby producing a series of electrical sparks to remove the metal of the workpiece, control means for said hydraulic-actuated means associated with and responsive to current flow in said electrical circuit to regulate said hydraulic-actuated means to move said tool toward the workpiece against the opposition of said gravity-responsive means at substantially the same rate as the rate of metal removal from the workpiece, and means supplying a dielectric fluid to said tank whereby the adjacent surfaces of said tool and workpiece are immersed in said dielectric fluid and said dielectric fluid is circulated therebetween during the shaping operation.

2. In an apparatus for electro-shaping a metallic workpiece, the combination comprising a tool having a contoured metallic working face, pressure-actuated means for mounting said tool for movement in one direction relative to the workpiece, gravity-responsive means connected to the tool to move it in the opposite direction relative to the workpiece when free to act, a power source, an electrical circuit connecting said power source to the working face of the tool and the workpiece whereby an electrical discharge is developed between the working face of the tool and the adjacent surface of the workpiece when positioned in predetermined spaced relationship thereby producing an electrical spark which removes metal from the workpiece, and means for controlling said pressure-actuated means associated with and responsive to current flow in said electrical circuit to regulate said pressure-actuated means whereby said tool is moved toward the workpiece against the opposition of said gravity-responsive means at substantially the same rate as the removal of metal from the workpiece.

3. In an apparatus for electro-shaping a metallic honeycomb workpiece into conformance with a contoured metallic working face of a tool, the combination comprising pressure-actuated means for movably mounting said tool for movement relative to the workpiece, regulating means for applying pressure to said pressure-actuated means to actuate the same to move said tool toward the workpiece and to relieve the pressure therefrom, gravity-responsive means opposing the movement of said tool by said pressure-actuated means and effective upon the relief of pressure from said pressure-actuated means to move said tool away from the workpiece, a power source, an electrical circuit connecting the working face of said tool and the workpiece to the power source whereby an electrical discharge occurs between the working face of said tool and the adjacent surface of the workpiece when positioned in predetermined spaced relationship, said electrical discharge producing a series of electrical sparks which remove the metal of the workpiece, said regulating means being associated with and responsive to current flow in said electrical circuit to regulate the application to and the relief of pressure from said pressure-actuated means whereby said tool is moved toward the workpiece at substantially the same rate as the metal is removed from the workpiece, and means for circulating a dielectric fluid through the cells of and around said workpiece and between the working face of said tool and the adjacent surface of the workpiece during the shaping operation.

4. In an apparatus for electro-shaping a metallic honeycomb workpiece into conformance with a contoured metallic working face of a tool, the combination comprising pressure-actuated means for movably mounting said tool for movement relative to the workpiece, means for delivering a pressurized fluid to said pressure-actuated means, means for regulating the delivery of said pressurized fluid to said pressure-actuated means to actuate the same to move said tool toward the workpiece or to relieve the pressure on the pressurized fluid, gravity-responsive means opposing the movement of said tool by said pressure-actuated means and effective upon the relief of the pressure on said pressurized fluid to move said tool away from the workpiece, an electrical circuit including a power source, the working face of said tool and the workpiece effective when the metallic working face of the tool is in predetermined spaced relationship with the adjacent surface of the workpiece to develop an electrical discharge therebetween that produces a series of electrical sparks which remove the metal of the workpiece, said regulating means being associated with and responsive to current flow in said electrical circuit to regulate the delivery of pressurized fluid to said pressure-actuated means or to relieve the pressure on said pressurized fluid so as to maintain said tool in said predetermined spaced relationship with the adjacent surface of the workpiece as the metal is removed from the workpiece, and means for circulating a dielectric fluid through and around said honeycomb workpiece and between the working face of said tool and the adjacent surface of the honeycomb workpiece during the shaping operation.

5. In an apparatus for electro-shaping a metallic honeycomb workpiece into conformance with a contoured metallic surface of a tool, the combination comprising a tank having a rack therein for supporting the honeycomb workpiece, gravity-responsive means supporting the tool for movement relative to the workpiece and imposing a force thereon tending to move it away from the workpiece, a hydraulic actuator engaged with the tool and operable to move the tool toward the workpiece against the opposing force of said gravity-responsive means, a valve for controlling the operation of said hydraulic actuator, electrically operated means for controlling said valve, a source of fluid, means for pressurizing and delivering fluid from said source to said valve, a return conduit and a by-pass conduit connecting said valve to said source of fluid, a power source, an electrical circuit including the power source, the metallic surface of the tool and the workpiece, said electrical circuit being effective to develop an electrical discharge between the metallic surface of the tool and the adjacent surface of the workpiece when they are in predetermined spaced relationship thereby producing a series of electrical sparks that remove the metal of the workpiece, said valve control means being associated with and responsive to the current flow in said electrical circuit to operate said valve whereby the pressurized fluid is metered between said hydraulic actuator and by-pass conduit and said hydraulic actuator and return conduit to thereby control the operation of said hydraulic actuator so that the tool is moved relative to the workpiece to establish and maintain said predetermined spaced relationship between their adjacent surfaces, and means for supplying a dielectric fluid to said tank and circulating it through and around said workpiece and between the adjacent surfaces of the tool and workpiece.

6. In an apparatus for electro-shaping a metallic workpiece into conformance with a contoured metallic surface of a tool, the combination comprising a tank having a support therein for the workpiece, gravity-responsive means supporting the tool for movement relative to the workpiece and imposing a force thereon tending to move it away from the workpiece, a hydraulic actuator including a cylinder and a ram extensible from said cylinder, said ram being engaged with the tool whereby the extension of the ram from the cylinder moves the tool toward the workpiece against the opposing force of said gravity-responsive means, a valve communicating with the interior of said cylinder, a source of fluid, an electrically driven pump connected to said source of fluid, a conduit receiving the output of said pump and delivering it to said valve, a return conduit and a by-pass conduit connecting said valve to said source of fluid, a power source, an electrical circuit connecting said power source to the metallic surface of the tool and the workpiece whereby an electrical discharge occurs between the metallic surface of the tool and the adjacent surface of the workpiece when they are in predetermined spaced relationship thereby producing a series of electrical sparks which remove the metal of the workpiece, control means for said valve connected in said circuit, electrical means connecting said pump to said power source to operate said pump, said pump being effective upon operation to deliver the fluid from its source under pressure through said delivery conduit to said valve, said valve control means being responsive to the current flow in said electrical circuit to actuate said valve to vary the delivery of the pressurized fluid to said cylinder and by-pass conduit and from said cylinder to said return conduit whereby said hydraulic-actuator is operated to move the tool relative to the workpiece against the opposing force of said gravity-responsive means to establish and maintain said predetermined spaced relationship between their adjacent surfaces, and means for supplying a dielectric fluid to said tank and circulating it between the adjacent surfaces of the tool and workpiece.

7. In an apparatus for electro-shaping a metallic workpiece into conformance with a contoured metallic surface of a tool, the combination comprising a tank having a support therein for the workpiece, gravity-responsive means supporting the tool and operative to move it away from the workpiece, a hydraulic actuator including a cylinder and a ram extensible from said cylinder, said tool being mounted on said ram whereby the extension of the ram from the cylinder moves the tool toward the workpiece against the operation of said gravity-responsive means, a valve communicating with the interior of said cylinder, a source of fluid, means for pressurizing and delivering fluid from said fluid source to said valve, a return conduit and a by-pass conduit communicating said valve with said source of fluid, electrical control means for said valve, an electrical circuit including power source, the metallic surface of the tool, the workpiece and the valve control means, said electrical circuit being operative to develop an electrical discharge between the metallic surface of the tool and the adjacent surface of the workpiece when they are in predetermined spaced relationship thereby producing a series of electrical sparks which remove the metal of the workpiece and to actuate said valve control means to regulate said valve so as to vary the delivery of the pressurized fluid between said cylinder and by-pass conduit and between said cylinder and said return conduit to thereby actuate the hydraulic-actuator to move the tool relative to the workpiece against the opposing force of said gravity-responsive means to establish and maintain the predetermined spaced relationship between their adjacent surfaces, and means for supplying a dielectric fluid to said tank and circulating it between the adjacent surfaces of the tool and workpiece.

8. In an apparatus for electro-shaping a workpiece of metallic honeycomb core material, the combination comprising a rack for supporting the workpiece consisting of at least two parallel slats dimensioned at their upper edges to engage the under-surface of the workpiece, a manifold positioned across an end of said slats, a distributing pipe extending laterally from said manifold and positioned between said slats, said distributing pipe having a plurality of ports therein opening in the direction of the upper edges of said slats, and means for supplying a fluid under pressure into and through said manifold and distributing pipe, said fluid being directed through said ports against the under-surface of the workpiece to flow through the cells of the honeycomb core material.

9. In an apparatus for electro-shaping a workpiece of metallic honeycomb core material, a rack for supporting the workpiece comprising a plurality of upstanding slats dimensioned at their upper edges to engage the under-surface of the workpiece, a manifold positioned across each end of said slats, a plurality of distributing pipes extending laterally from each manifold and positioned one between each adjacent pair of slats, each of said distributing pipes having a plurality of ports therein opening in the direction of the upper edges of said slats, and means for pumping a fluid into and through said manifolds and distributing pipes, said fluid being directed through said ports against the under-surface of the workpiece to flow through the cells of the honeycomb core material.

References Cited in the file of this patent

UNITED STATES PATENTS

| | | |
|---|---|---|
| 1,367,394 | Instone | Feb. 1, 1921 |
| 1,562,204 | Carlstedt | Nov. 17, 1925 |
| 1,996,274 | Burks | Apr. 2, 1935 |
| 2,132,879 | Pownall | Oct. 11, 1938 |
| 2,588,744 | McKechnie | Mar. 11, 1952 |
| 2,761,050 | Ballhousen | Aug. 28, 1956 |
| 2,762,946 | Manchester | Sept. 11, 1956 |
| 2,765,394 | Griffith | Oct. 2, 1956 |

FOREIGN PATENTS

| | | |
|---|---|---|
| 637,793 | Great Britain | May 24, 1950 |